W. F. DREW.
VALVE.
APPLICATION FILED JUNE 26, 1912.

1,091,048.

Patented Mar. 24, 1914.

Attest:
Clarence G. Campbell
Alan C. McDonnell

Inventor:
Warren F. Drew
by William R. Baird his Atty

UNITED STATES PATENT OFFICE.

WARREN F. DREW, OF NEW YORK, N. Y., ASSIGNOR, BY MESNE ASSIGNMENTS, TO ROTICO FITTING AND SUPPLY COMPANY, OF NEW YORK, N. Y., A CORPORATION OF NEW YORK.

VALVE.

1,091,048.  Specification of Letters Patent.  Patented Mar. 24, 1914.

Application filed June 26, 1912.  Serial No. 705,915.

*To all whom it may concern:*

Be it known that I, WARREN F. DREW, a citizen of the United States, residing at New York, in the county of New York and State of New York, have invented certain new and useful Improvements in Valves, of which the following is a specification.

This invention relates to valves for fluid conduits and the like and its novelty consists in the construction and adaptation of the parts, as will be hereinafter pointed out.

The invention relates particularly to that class of valves comprising a relatively rotatable inner plug and outer casing or body and, particularly where the fluid adapted to pass through the valve, is intended to change the direction of its flow at its exit from the valve. Valves of this character are difficult to pack, usually leak after a short period of use and become affected by unequal expansion of the parts when brought into contact with liquids of varying temperatures.

The purpose of my invention is to provide a valve which is simple to make, easy to pack, does not readily leak and which is not readily affected by change of temperature.

Figure 1:
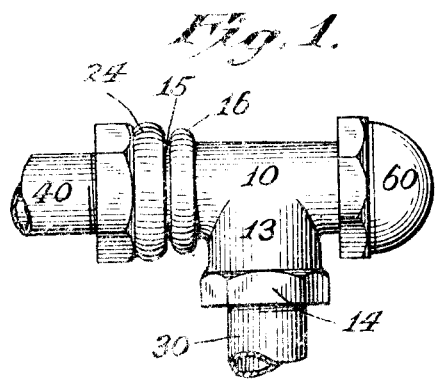
Figure 2:
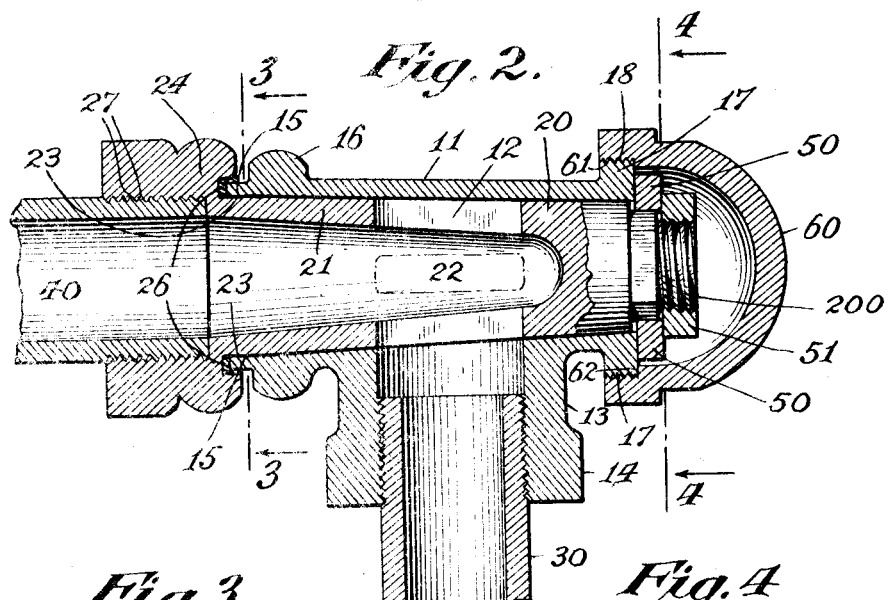
Figure 3:
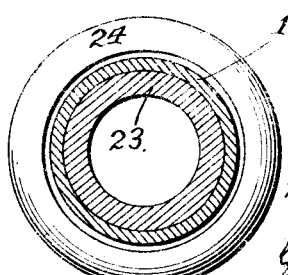
Figure 5:
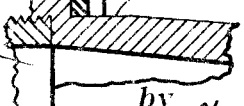
Figure 4:
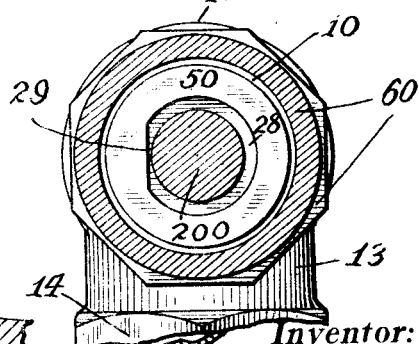

In the drawings: Figure 1 is a side elevation of a valve embodying my invention, a portion of the adjacent conduits being shown in connection therewith. Fig. 2 is an enlarged central longitudinal section through the same. Fig. 3 is a transverse section on the plane of the line 3—3 in Fig. 2, looking toward the left. Fig. 4 is a transverse section on the plane of the line 4—4 in Fig. 2, also looking toward the left, and Fig. 5 is an enlarged detail of the annular groove between the cylindrical ends of the casing and plug.

In the drawings, 10 is the body, or casing, of the valve comprising a conical barrel 11 having a conical bore and provided with a laterally projecting annular flange 13, the latter having terminal hexagonal sides 14. A suitable passage leads from the bore to the interior of the flange 13. At its widest end the body of the valve becomes cylindrical, as indicated at 15. It is provided externally with reinforcing ribs 16 and 17, the latter being externally threaded at 18. The annular flange is internally threaded, and adapted to be engaged by a conduit or fitting 30.

The plug 20 comprises a conical body 21 provided with the usual through and through port (indicated at 12 in full lines to show the valve in open position and in dotted outline at 22 to indicate the closed position). At its widest end it is provided with a cylindrical portion indicated at 23, and which is provided with an outwardly reverted annular flange 24, the inner wall of which 25 is concentric with the corresponding outer cylindrical surface 15 of the plug 20, so that between these two concentric surfaces there is formed an annular groove adapted to receive an elastic packing, indicated at 26. Beyond the flange 24 the body of the plug is threaded, as indicated at 27, and which threads are engaged by the threaded end of a suitable conduit or fitting 40. The plug is provided at its smaller end with a restricted portion 28 planed at one place 29 to engage a D-washer 50 adapted to fit over the same, and which is in close contact with the extremity of the casing 10. It is further provided with a threaded end 200 adapted to receive a retaining nut 51 which, when in position, presses closely against the washer 50. A cap 60, internally threaded at 61, is adapted to engage the threads 18 on the outer surface of the rib 17 of the body 10. It is provided with a shoulder 62 adapted to contact with the extremity of the casing to limit its position.

The casing is intended to fit loosely over the plug and the cylindrical end of the casing is intended to fit loosely against the cylindrical surface of the plug but to press tightly against the elastic packing 26. The washer 50 is treated lightly with a lubricant to seal the joint between it and the casing and between it and nut 51. The cap 60 is filled with grease or other lubricant before being placed in position.

The extremity of the plug 20, the annular flange 13 and the cap 60 are provided with the usual polygonal surfaces to facilitate their engagement by a wrench.

By the use of this construction the plug and casing move readily with respect to each other. The packing 26 keeps the joint which it seals securely closed against leakage and by its inherent elasticity constantly tends to preserve the contact between the smaller end of the body and the D-washer on the plug and thus securely seals that joint, and which sealing is further facilitated by the grease with which the cap is filled. The packing, when worn, can readily be reinforced or replaced by a new piece.

What I claim is:

1. In a valve, a fixed tapered plug having an external cylindrical surface and a longitudinal bore having an inlet opening through the larger end, and an outlet opening through one side, said bore terminating short of the smaller end, said larger end having an enlarged extension provided with an annular groove in the side that faces the cylindrical surface, a valve body rotatably mounted on the plug and having a tapered bore that receives the same, said body having a port movable into and out of communication with the discharge end of the plug bore, fastening means detachably mounted on the smaller end of the plug and abutting against the adjacent end of the body, the opposite end engaging in the annular groove, and yielding means located in said groove and constituting both a packing at the larger end of the valve body and also means for urging said body outwardly against the fastening means.

2. In a valve, a fixed tapered plug having an external cylindrical surface and a longitudinal bore opening through its larger end and through one side, but terminating short of the smaller end, said larger end having an enlarged extension formed integrally therewith and provided with an annular groove in the side that faces the cylindrical surface, the smaller end of the plug having a restricted portion for the reception of a holding device, a valve body rotatably mounted on the plug and having a tapered bore that receives the same, said body having a port moving into and out of communication with the bore of the plug and also having a circular lip that enters the groove of the extension, fastening means detachably mounted on the restricted portion of the plug and abutting against the end of the body, and a yielding ring located in the groove and compressed between the bottom thereof and the lip of the body, said ring constituting a packing at the larger end of the body and urging the smaller end of the body into close contact with the fastening means to prevent leakage thereat.

In testimony whereof I affix my signature in presence of two witnesses.

WARREN F. DREW.

Witnesses:
A. C. McDONNELL,
CLARENCE G. CAMPBELL.